US009317852B2

(12) United States Patent
Kemp

(10) Patent No.: US 9,317,852 B2
(45) Date of Patent: Apr. 19, 2016

(54) METHOD AND SYSTEM FOR RECOMMENDING CONTENT ITEMS

(75) Inventor: Thomas Kemp, Esslingen (DE)

(73) Assignee: SONY Deutschland GmbH, Berlin (DE)

( * ) Notice: Subject to any disclaimer, the term of this patent is extended or adjusted under 35 U.S.C. 154(b) by 786 days.

(21) Appl. No.: 12/593,927

(22) PCT Filed: Mar. 7, 2008

(86) PCT No.: PCT/EP2008/001839

§ 371 (c)(1), (2), (4) Date: Nov. 17, 2009

(87) PCT Pub. No.: WO2008/119436

PCT Pub. Date: Oct. 9, 2008

(65) Prior Publication Data

US 2010/0088649 A1 Apr. 8, 2010

(30) Foreign Application Priority Data

Mar. 31, 2007 (EP) .................................... 07006774

(51) Int. Cl.
*G06F 3/048* (2013.01)
*G06Q 30/00* (2012.01)

(52) U.S. Cl.
CPC .................................... *G06Q 30/00* (2013.01)

(58) Field of Classification Search
CPC ................................................ H04N 21/4532
USPC ........................................... 725/46; 715/845
See application file for complete search history.

(56) References Cited

U.S. PATENT DOCUMENTS

| | | | | |
|---|---|---|---|---|
| 5,617,565 | A * | 4/1997 | Augenbraun et al. | |
| 6,088,722 | A * | 7/2000 | Herz et al. | 709/217 |
| 7,488,886 | B2 | 2/2009 | Kemp | |
| 7,593,921 | B2 | 9/2009 | Goronzy et al. | |
| 2002/0083468 | A1 * | 6/2002 | Dudkiewicz | 725/133 |
| 2003/0061183 | A1 * | 3/2003 | Schaffer et al. | 706/8 |
| 2003/0093792 | A1 * | 5/2003 | Labeeb et al. | 725/46 |
| 2003/0110507 | A1 * | 6/2003 | Dimitrova et al. | 725/110 |

(Continued)

FOREIGN PATENT DOCUMENTS

| | | |
|---|---|---|
| JP | 10-162027 | 6/1998 |
| JP | 10-162028 | 6/1998 |

(Continued)

OTHER PUBLICATIONS

Office Action issued Jul. 21, 2011 in China Application No. 200880011179.3 (English Translation).

(Continued)

*Primary Examiner* — William Trapanese
(74) *Attorney, Agent, or Firm* — Oblon, McClelland, Maier & Neustadt, L.L.P.

(57) ABSTRACT

A method for recommending content items of a content item data base to a user, including: broadcasting user group characteristics, wherein a respective user group characteristic is descriptive of a respective user group; receiving at a user's location the user group characteristics; assigning at the user's location the user to at least one of the user groups, providing user group preference data, the user group preference data being descriptive of a relation between the user groups and the content items; and recommending content items according to the user group preference data.

24 Claims, 9 Drawing Sheets

(56) References Cited

U.S. PATENT DOCUMENTS

| | | | | |
|---|---|---|---|---|
| 2005/0114388 | A1 | 5/2005 | Goronzy et al. | |
| 2005/0120591 | A1 | 6/2005 | Andrew et al. | |
| 2005/0131688 | A1 | 6/2005 | Goronzy et al. | |
| 2005/0160449 | A1 | 7/2005 | Goronzy et al. | |
| 2006/0120536 | A1 | 6/2006 | Kemp | |
| 2008/0201370 | A1 | 8/2008 | Kemp et al. | |
| 2008/0215709 | A1 | 9/2008 | Kemp | |
| 2008/0276186 | A1 | 11/2008 | Feduszczak et al. | |
| 2009/0013002 | A1 | 1/2009 | Eggink et al. | |
| 2009/0031882 | A1 | 2/2009 | Kemp et al. | |
| 2009/0069914 | A1 | 3/2009 | Kemp et al. | |
| 2009/0084249 | A1 | 4/2009 | Kemp et al. | |
| 2009/0178081 | A1* | 7/2009 | Goldenberg et al. | 725/46 |
| 2009/0228333 | A1 | 9/2009 | Kemp | |
| 2009/0228796 | A1 | 9/2009 | Eggink et al. | |
| 2009/0248607 | A1 | 10/2009 | Eggink et al. | |

FOREIGN PATENT DOCUMENTS

| | | |
|---|---|---|
| JP | 2001-298677 | 10/2001 |
| JP | 2004-357179 | 12/2004 |
| JP | 2005-27043 | 1/2005 |
| KR | 10-2006-0112723 | 11/2006 |
| KR | 10-2006-0112723 A | 11/2006 |

OTHER PUBLICATIONS

Chinese Office Action issued May 9, 2012 in patent application No. 200880011179.3 with English translation.

European Office Action issued Oct. 17, 2012, in Patent Application No. 07 006 774.9.

Office Action issued Jan. 15, 2014, in Korean Patent Application No. 10-2009-7020388.

Combined Chinese Office Action and Search Report issued Jul. 2, 2015 in Patent Application No. 200880011179.3 (with English translation of categories of cited documents).

Office Action issued Oct. 16, 2012 in Japanese Application No. 2010-501395 (With English Summary Translation).

* cited by examiner

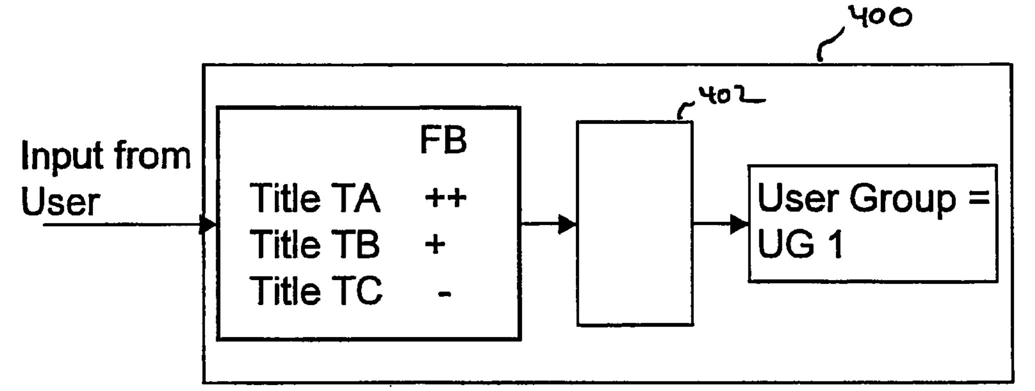
FIG 4a
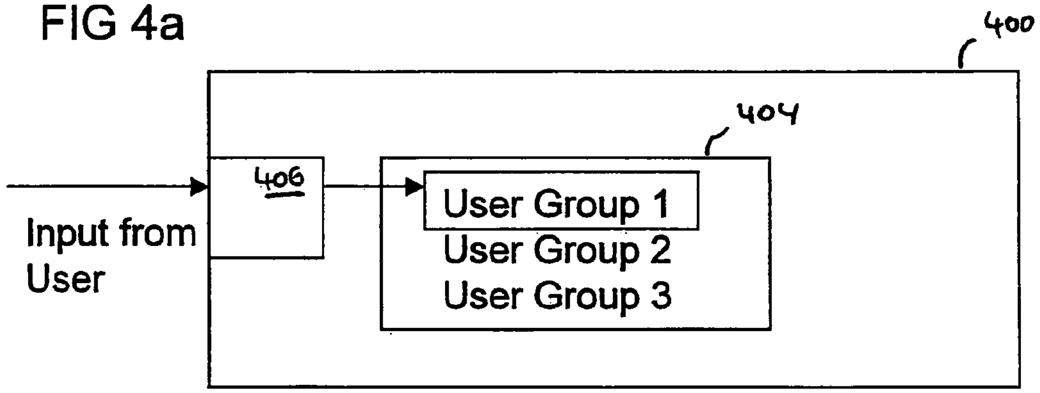
FIG 4b
UG1 Western
- UG1a John Wayne
- UG1b Gary Cooper
UG 2 Science Fiction
- UG2a Star Trek
  - UG2aa 1st serie
  - UG2ab 2nd serie
- UG2b Comedy
| | | | | | | | | |
|---|---|---|---|---|---|---|---|---|
| UG1 | UG2 | UG1a | UG1b | UG1 | UG2 | UG2a | UG2b | UG1 |
FIG 9

METHOD AND SYSTEM FOR RECOMMENDING CONTENT ITEMS

The invention relates to a method for recommending content items. The invention also relates to a system and a receiver for recommending content items.

BACKGROUND

Recommendation and personalization related systems exist in the academic world as well as commercial services. There are two major schools, collaborative filtering, where recommendations for a user are given based on the behavior of other users that are considered "similar" to a target user and content based filtering, where recommendations for a user are based on similarity of items the user likes to the items in the database. Most systems that are currently deployed make use of the collaborative filtering since it is difficult to create a meta database for all items, which is generally required to compute the similarity between content items. However, all systems of this kind are essentially server-based, which a) requires a connection to the server, where client usage data is sent to and b) requires a back connection to a client where the recommendations are sent.

However, for many systems, like e.g. television sets (TV sets) a bi-directional connection is typically not available.

It is an object of the present invention to recommend content items without needing a bi-directional connection.

The object is solved by a method, a system and a receiver according to the claims.

Further embodiments are defined in dependent claims.

Further details will become apparent from a consideration of the drawings and ensuing description.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which FIG. 4A shows schematically an automatic assignment of user groups to a user in a receiver at a user's location, FIG. 4B shows an embodiment for a manual assignment of a user group based on an input from a user, FIG. 9 shows schematically a hierarchical transmission of user group characteristics.

DETAILED DESCRIPTION

In the following, embodiments of the invention are described. It is important to note that all described embodiments in the following may be combined in any way, i.e. there is no limitation that certain described embodiments may not be combined with others.

Figure 1:
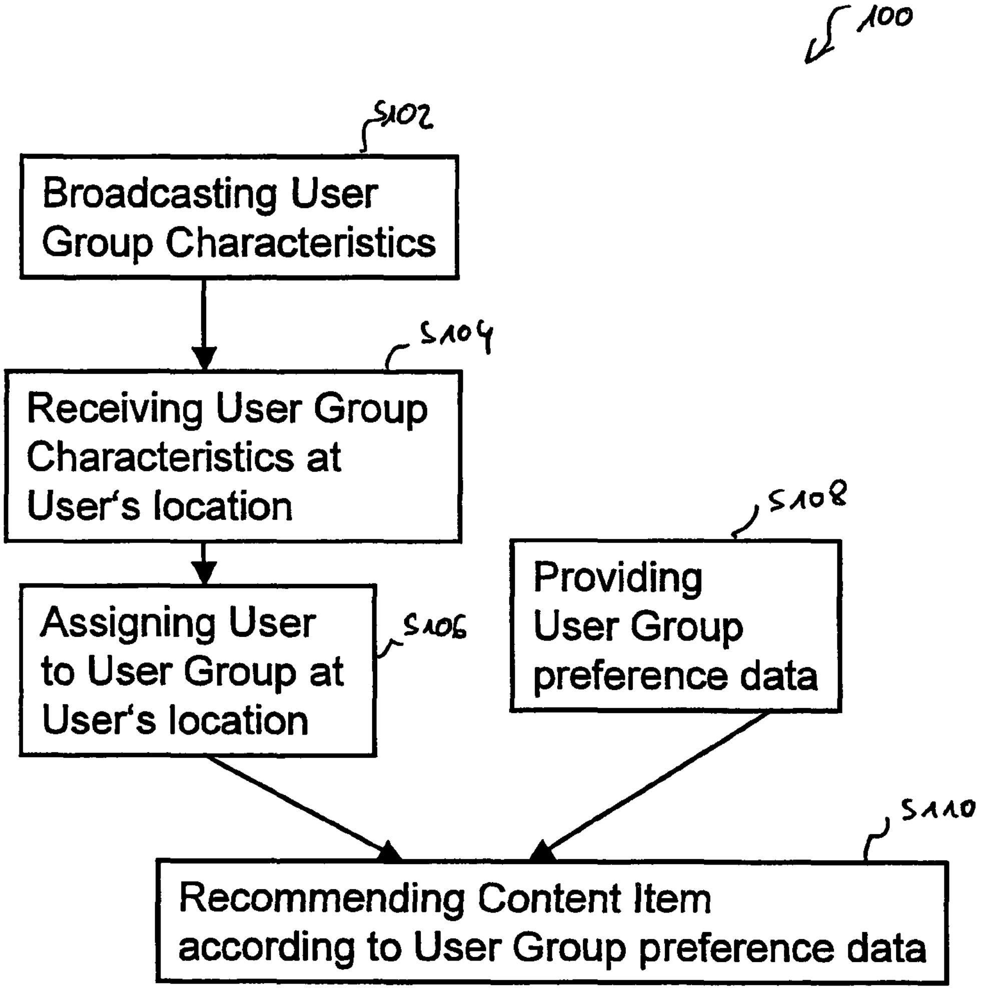
FIG. 1 shows a schematic flow chart of a method for recommending content items.

In FIG. 1 a flow chart 100 for a method for recommending content items is depicted. Content items might be video or audio data files, games, TV programs, picture files, text files or merchandise items like books, jewelry, clothes, or any other items that might be useful for a user and that might be classified according to a personal taste of the user. Since users with corresponding personal taste might have given recommendations, positive feedback or positive ratings already to a plurality of content items the user might be interested in such positively rated content items. From assembling feedback or recommendations from a plurality of probe users user group characteristics might be derived. The user group characteristics may be, e.g. a file with information, how the corresponding user group UG is defined. In the example of TV programs there might be user groups for "Western", "Science Fiction", "Comedy" or certain user groups, which focus on a certain actor, e.g. "Clark Gable" or "Marilyn Monroe". In the example of audio data files as content items, such user groups may be established, e.g. for certain artists like "Madonna", "Beatles" or for certain music styles, e.g. "Punk", "Pop of the 80's" and so on. The user group characteristic may comprise rating information for content items, e.g. rating information for individual TV programs, individual radio channels, songs, videos, books etc., or more implicit information, e.g. information how frequently a given program is watched by typical members of respective user group.

In step S102 the user group characteristics are broadcasted, for example via satellite or other wireless communications or via wired communication, e.g. via the internet.

The broadcasted user group characteristics, which are received at a user's location, for example the home, the office, the mobile phone, the personal digital assistant, the car of the user, at step S104 are used to assign the user to a corresponding to one or a plurality of user groups locally, i.e. at the user's location, in a third step S106. With this local assignment the user is not obliged to identify his personal taste to some central content item provider, which is important for some users to keep their privacy secret.

In a fourth step S108 user group preference data is provided. Such user group preference data correlates the user group with the preferred content items of the user group. Such preferred content items might have been either already positively rated by probe users of said user group or might most possibly would be positively rated due to some descriptive meta data, which is assigned to the content items and which might identify the taste of the members of the respective user group.

The user group preference data is used to recommend content items to the user in a fifth step S110, while correlating such user group preference data with available data for the content items, e.g. content items identifications (ID) or descriptive meta data for the content items.

In an embodiment the user may manually select one of the user groups, to which the user group characteristics have been received. This is an easy way to assign the user to a user group without elaborate algorithms or electronic devices within a receiver at the user's location.

In a further embodiment the usage behavior of the user is evaluated, and automatically a user group assignment is carried out for the user. If, for instance, a user often looks Sitcoms or often listen to operas of Mozart, the user might automatically assigned to user groups “Sitcom” or “Mozart operas”, respectively, and afterwards corresponding content items with Sitcoms or Mozart operas might recommended. Even slightly different content items, e.g. an opera of another composer, e.g. Verdi, which pleases probe users of the “Mozart opera” user group, which gave a positive rating to this Verdi opera, can be recommended to the user.

According to a further embodiment such user groups are derived automatically by identifying correlated content items (e.g. books of “Shakespeare”) and group probe users, which gave similar, e.g. positive feedback to most of these correlated content items.

In a further embodiment further feedback of probe user is used to adapt the user group characteristics and to broadcast the adapted feedback afterwards. If, e.g. a new artist pleases the probe users of a user group “folk songs”, an identifier relating to this new artist might be included into the user group characteristic of the user group “folk songs” and might be used to recommend a song of this new artist to a user at a user’s location.

In a further embodiment the user group preference data is determined by assigning content item identifications of content items to said users groups. For example, certain “titles” or even known “identifier-tags” of content item data files could be used to build a list of positively rated titles or identifier-tags for each user group and use this list at the user’s location to recommend content items.

In embodiments where the user groups or some user group identifiers are known to providers of content items for instance, it is possible to transmit the content item together with a user group identifier to the user’s location, so that at the user’s location a recommendation can be given due to the user group identifier of a user group, to which the user is assigned. So the user group identifier is used as user group preference data.

According to a further embodiment descriptive meta data might be used as user group preference data. Such descriptive meta data is already available for content items, e.g. the title, the names of the actors, the genre of movies, or the name of the artists, the song title or the music genre of songs and so on. When correlating such descriptive meta data to user group descriptive meta data, e.g. because such user groups are characterized by similar descriptive meta data, at the user’s location the respective descriptive meta data can be correlated and corresponding recommendations can be given. For example a content item meta data “song of 90s” to a content item might be easily correlated to a user group descriptive meta data “songs of last decade of $20^{th}$ century”. In many cases such meta data might even be the same, e.g. “rock” as content item descriptive meta data for a song and as user group descriptive meta data for an exemplary user group “Rock music”.

In a further embodiment, such descriptive meta data might even be determined at the user’s location. For instance it is known to extract an identifier (a so-called “fingerprint”) from the actual data of a content item and use such identifier, which also may describe a mood of a song, for example to correlate this mood with the user group characteristic to recommend corresponding content items.

Figure 2:
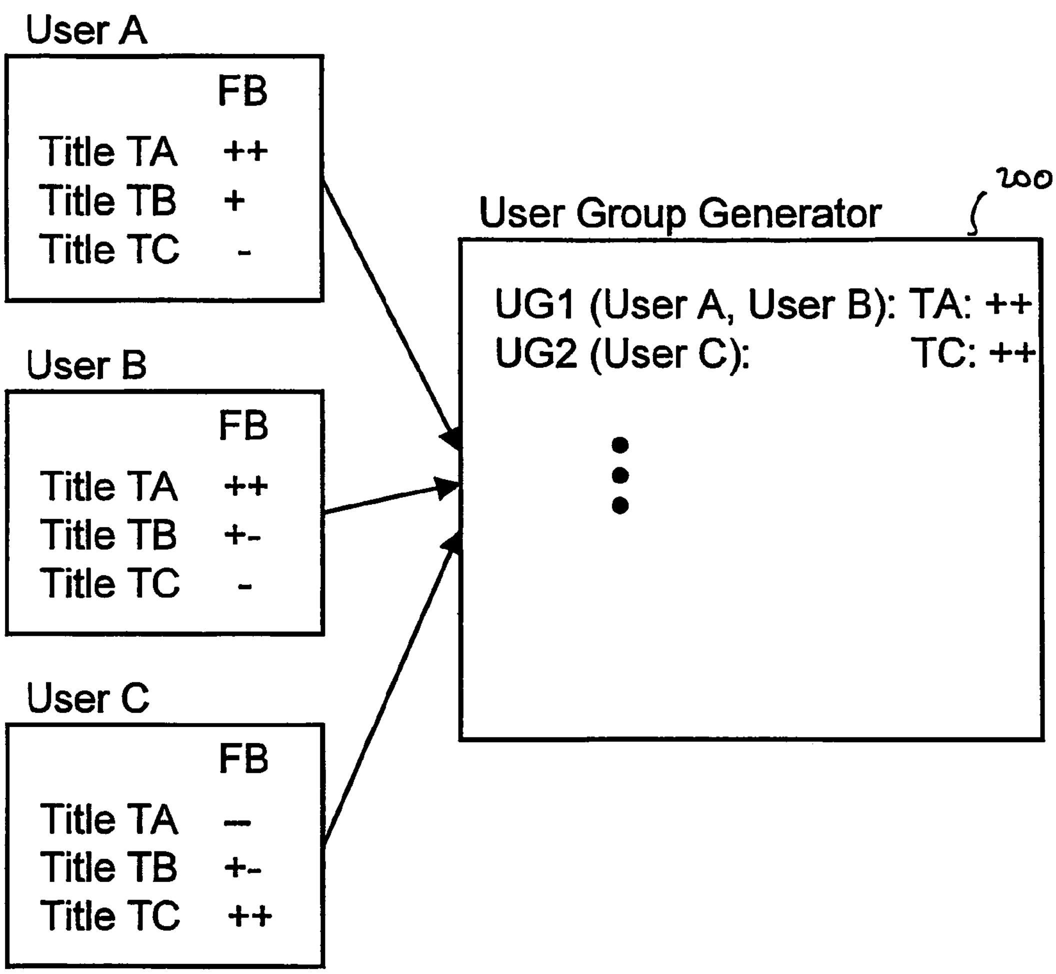
FIG. 2 shows an embodiment for the generation of user groups in a user group generator.
Figure 3:
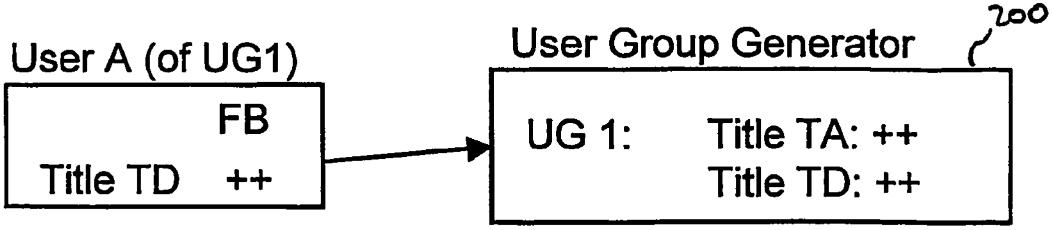
FIG. 3 is showing an embodiment for adapting a user group in accordance with a new feedback of the user.

In FIG. 2 an exemplary embodiment of generation of a user group by a user group generator 200 is depicted. Three probe users User A, User B and User C are providing their respective feedback FB to certain titles, which correspond to corresponding content items. The first probe user User A gives a very good (++) feedback to the content item with title TA, a good (+) feedback to a second content item with title TB and a negative (−) feedback to a third content item with title TC. A second user User B gives a very positive (++) feedback to the first content item with title TA, an indifferent (+−) feedback to the second content item with title TB and a negative feedback to the third content item with title TC. A third probe user User C gives a very negative (−−) feedback to the first content item with title TA, an indifferent (+−) feedback to the second content item with the title TB and a very positive (++) feedback to the third content item with the title TC. The user group generator 200 automatically groups the received feedbacks from the three probe users A B C, thereby grouping probe users User A and User B into a first user group UG1, which is identified by giving a very positive (++) feedback to the first content item with the title TA. The user group generator 200 identifies a second user group UG2 to which the third probe user User C is assigned, characterized by giving a very positive (++) feedback to the third content item with title TC. The very positive (++) feedback for the first content item with the title TA can be used as user group characteristic for the first user group UG1, the very positive (++) feedback to the third content item with the title TC can be used as user group characteristics for the second user group UG2. After assembling further feedbacks for further content items with further titles, as it is depicted for example in FIG. 3, where the first user User A, which is assigned to the first user group UG1, gave a very positive feedback (++) to a further content item with a further title TD. The user group generator 200 may adapt the user group characteristic of the first user group UG1 by adding the information to the user group characteristic that probe users of said first user group UG1 give a very positive (++) feedback to the further content item with title TD.

According to a further embodiment a receiver for recommending content items of content item data base to a user is provided, said receiver being configured to receive broadcasted user group characteristics, wherein a respective user group characteristic is descriptive of a respective user group, and user group preference data, said receiver comprising a processor configured to assign at least one of said user groups to said user and to recommend content items to said user according to said user group preference data.

Such receiver is located at the user’s location and may be at least a part of e.g. a television set, a radio receiver, a mobile phone, a computer, a personal digital assistant or any other device, which can be used to recommend or directly use content items.

The user group characteristics that are derived automatically by the user group generator 200 are broadcasted to a user’s location, for example the receiver situated at a home of the user. Such receiver might be a satellite receiver or might comprise a so-called set-top-box.

As it is depicted in FIG. 4A within the receiver 400 at a user’s location in a first embodiment an input from the user, for example a feedback to content items is used to automatically assign a corresponding user group to the user. As it is depicted in FIG. 4A the user gave a very positive feedback to the first content item with the title TA, a positive feedback (+) to the second content item with the title TB and a negative (−) feedback to the third content item with the title TC. This feedback is evaluated by a processor 402 which compares the provided feedback from the user with the received user group characteristics, thereby identifying that the feedback of the user corresponds to the user group characteristics of the first user group UG1, i.e. a very positive (++) feedback of the first content item with the title TA. So a totally automatic assignment of user groups to users may be achieved.

A further embodiment is depicted in FIG. 4B, wherein the receiver 400 comprises a display 404, on which the received user groups are displayed. An input mechanism 406 for example a remote control is provided, on which the user can select at least one of the displayed user groups. In FIG. 4B the user is selecting the first user group UG1.

According to a further embodiment a system is provided for recommending content items of a content item data base to a user, comprising: a broadcasting device, said broadcasting device being configured to broadcast user group characteristics, wherein a respective user group characteristic is descriptive of a respective user group, and user group preference data; and a receiver, said receiver being configured to receive said broadcast user group characteristics and said user group preference data, said receiver comprising a processor configured to assign at least one of said user groups to said user and to recommend content items to said user according to said user group preference data.

In FIGS. 5 to 8 embodiments of a system and a receiver for the provision of user group preference data are depicted.

Figure 5:
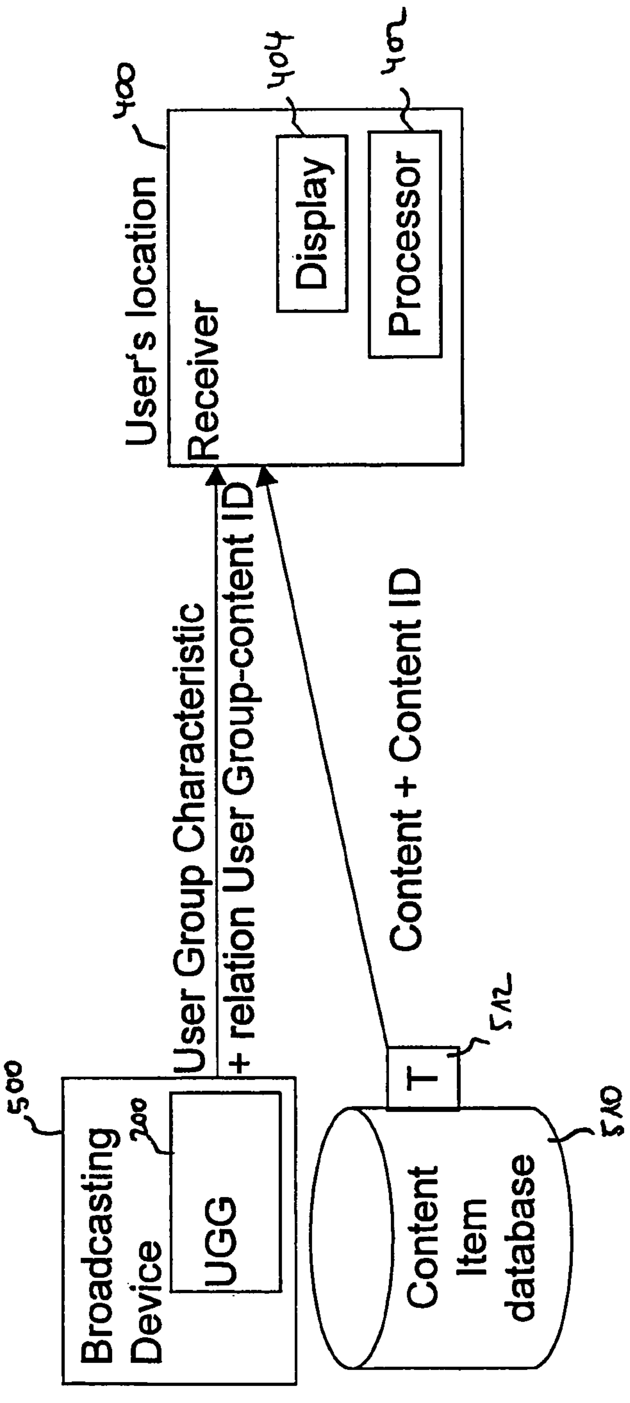
FIG. 5 is showing a first embodiment for generating and transmitting user group preference data.

In FIG. 5 a first embodiment for providing user group preference data is depicted. A broadcasting device 500 comprises the user group generator 200 and is adapted to broadcast user group characteristics to the receiver 400 at the user's location. A content item database 510 is transmitting the content items of this content item database to the receiver 400 via a transmitter 512. The transmitter 512 may transmit the content items via wireless connections, e.g. via satellite or terrestrial wireless broadcasting or via a cable connection, e.g. the internet. Within the user group generator 200 a list relating the user groups to content identifications (ID) is derived as user group preference data. Said list is broadcasted or transmitted to the receiver 400 at the user's location. The transmitter 512 transmits additionally to the content item as well the corresponding content identification (ID). The processor 402 of the receiver 400 can recommend content items from the content item database to the user afterwards, because a user group has been assigned to the user, the user group preference data relates this assigned user group to content IDs, which identify the corresponding content items from the content item database 510.

Figure 6:
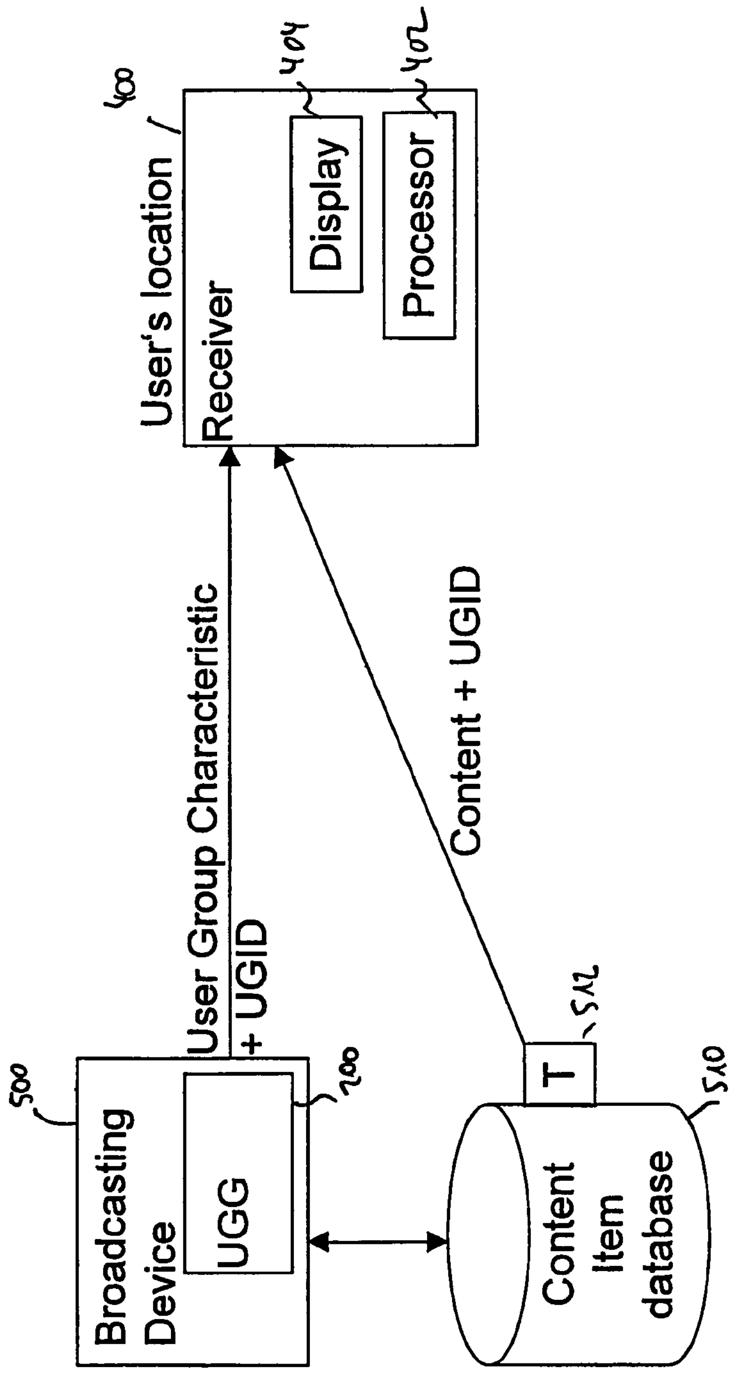
FIG. 6 shows a second embodiment for generating and transmitting user group preference data.

In a second embodiment depicted in FIG. 6 the broadcasting device 500 with the user group generator 200 is connected with the content item database 520 so that the broadcasting device 500 and the content item database 510 can communicate with each other, so that the user group generator 200 can provide a user group identification (UGID) to the content item database 510. The broadcasting device 500 is transmitting the user group characteristics the user group UGID to the receiver 400 at the user's location. The content item database 510 uses the user group identification UGID, transmitted from the user group generator 200, to transmit said user group identification UGID together with the content items, which were rated positively by the probe users of the user group corresponding to the user group identification UGID. Within the receiver 400 the processor 402 may derive from the assigned user group the corresponding user group identification UGID and look for the corresponding user group identification UGID when receiving the transmitted content items. Content items which are transmitted with the user group identification UGID of the assigned user group can be recommended by the processor 402.

This second embodiment is especially suited for a scheme, wherein the broadcasting device 500 and the content item database 510 are provided by the same content provider, e.g. by an internet server.

Figure 7:
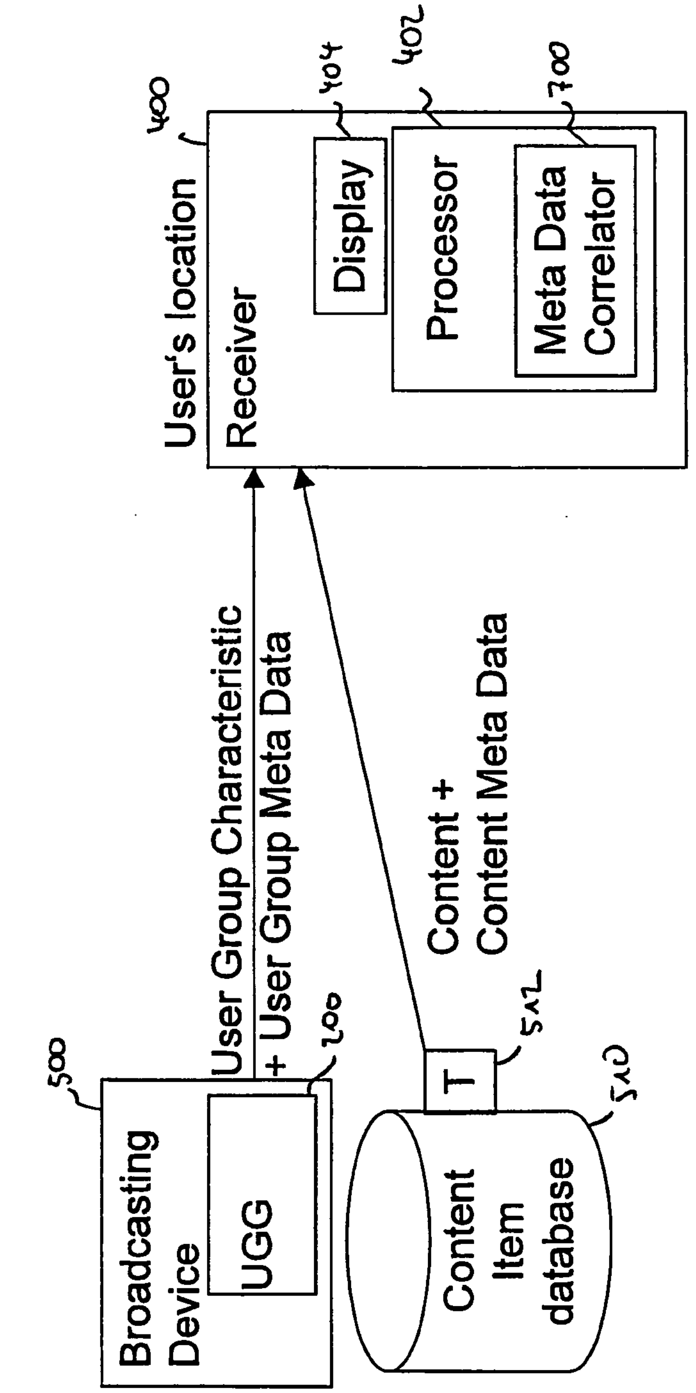
FIG. 7 shows a third embodiment for generating and transmitting user group preference data.

In FIG. 7 a third embodiment of providing user group preference data is depicted. In this third embodiment the broadcasting device 500 is transmitting user group characteristics together with a list of user groups relating to user group descriptive metadata. Such metadata may be e.g. in case of movies as content items the names of certain actors normally playing in movies liked by a corresponding user group or keywords for titles that are normally rated positively from members of this user group. Within the content item database 510 content item descriptive metadata are stored for the respective content items and transmitted, e.g. together with the content items, to the receiver 400 at the user's location. The processor 402 comprises a metadata correlator 700, which compares the user group descriptive metadata with the content item descriptive metadata and recommends content item with similar metadata to the user.

Figure 8:
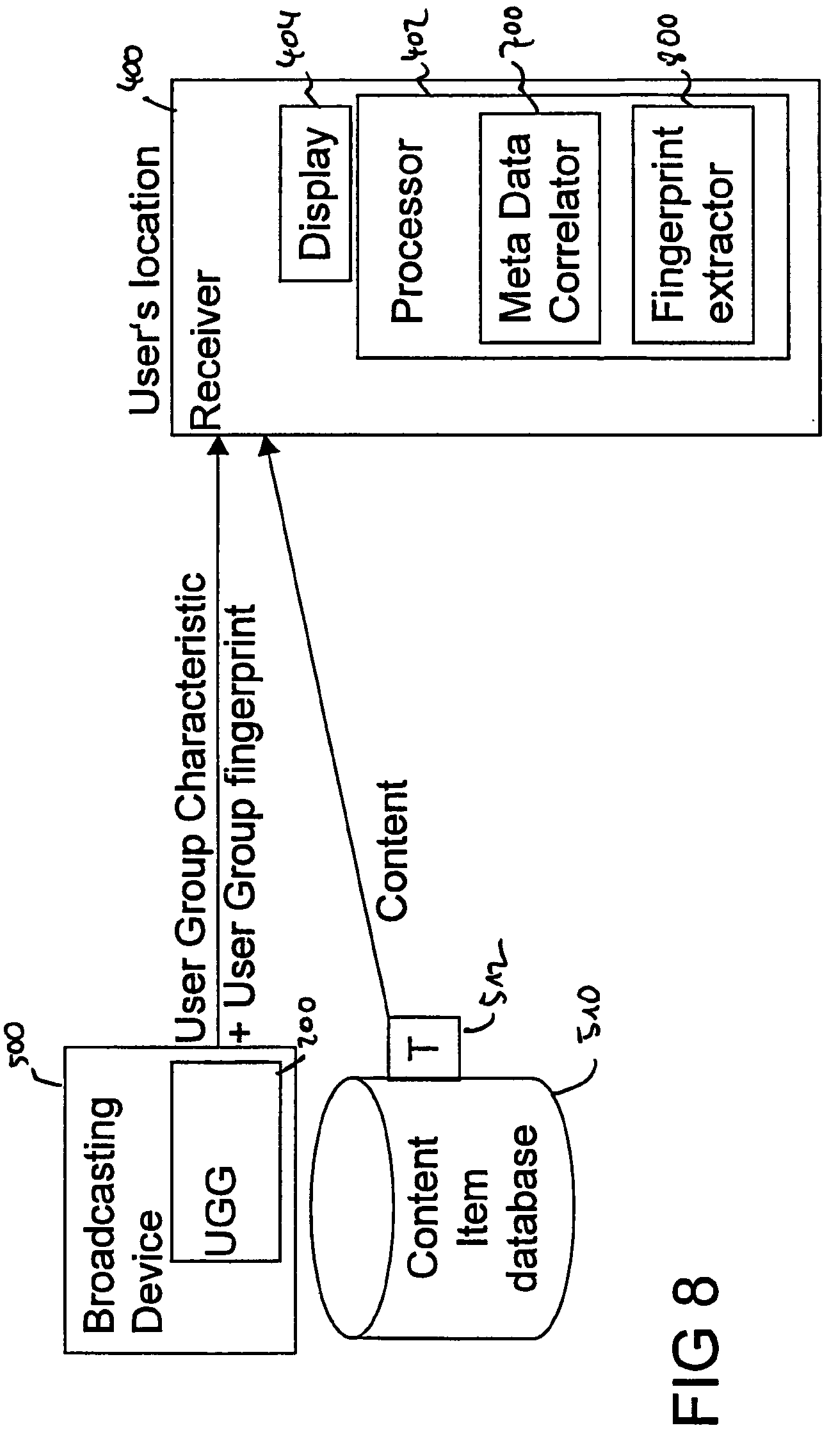
FIG. 8 is showing a fourth embodiment of generating and transmitting user group preference data.

A fourth embodiment of providing user group preference data is depicted in FIG. 8. The broadcasting device 500 is transmitting user group characteristics and a list of user groups related to so-called "fingerprints" of content items to the receiver 400 at the user's location. The transmitter 512 transmits the content items to the receiver 400 at the user's location. The processor 402 within the receiver 400 comprises a fingerprint extractor 800, which is able to derive a "fingerprint" from said transmitted content item and compares this "fingerprint" with the "fingerprint" data received from the broadcasting device 500. In case this comparison results in a similar "fingerprint" for the received content item, which corresponds to the assigned user group, the corresponding content item is recommended to the user. A "fingerprint" might be an identification tag, derived from at least a part of audio data , e.g. a song, uniquely identifying this part, by e.g. a length of bytes.

With these embodiments there is no need for a back channel from the receiver 400 to the broadcasting device 500 or to the content item database 510. Even without such a back channel the recommendations given by the processor 402 within the receiver 400 is based on a collaborative filter approach, since it is evaluated by the feedback of the probe users A B C. So it is well suited for the systems without a back channel, e.g. for broadcasting television or for systems, in which users do not wish to give their feedback to a central device, e.g. the content item database 510 or a content provider, which owns such content item databases 510.

As it is depicted in FIG. 9 the user group characteristics may comprise a hierarchical order. A first main user group UG1, herein depicted "western" comprises two sub-groups, herein titled "UG1A John Wayne, and UG1B Gary Cooper". A second main group "UG2 Science Fiction" comprises two sub-groups UG2A Star Trek and UG2B Comedy, wherein the first sub-group UG2A Star Trek further comprises two sub-sub-groups UG2AA First Series and UG2AB Second Series. As it is depicted in the lower part of FIG. 6 the user group information in case such a hierarchical order of user group characteristics is used may be transmitted in a way, that first the user group characteristics of the main groups UG1, UG2 are transmitted and only afterwards the user group characteristics of sub-groups UG1*a*, UG1*b* UG2*a* or sub-sub-groups UG2*aa*, UG2*ab*. With this transmission scheme the receiver 400 may already start to assign a user group to the user when the receiver 400 only has received the first user group characteristics (i.e. the user group characteristics of the main groups UG1, UG2) and not yet the user group characteristics of the sub-groups UG1*a*, UG1*b*, UG2*a*, UG2*b* or the sub-sub-groups UG2*aa*, UG2*ab*.

Figure 10:
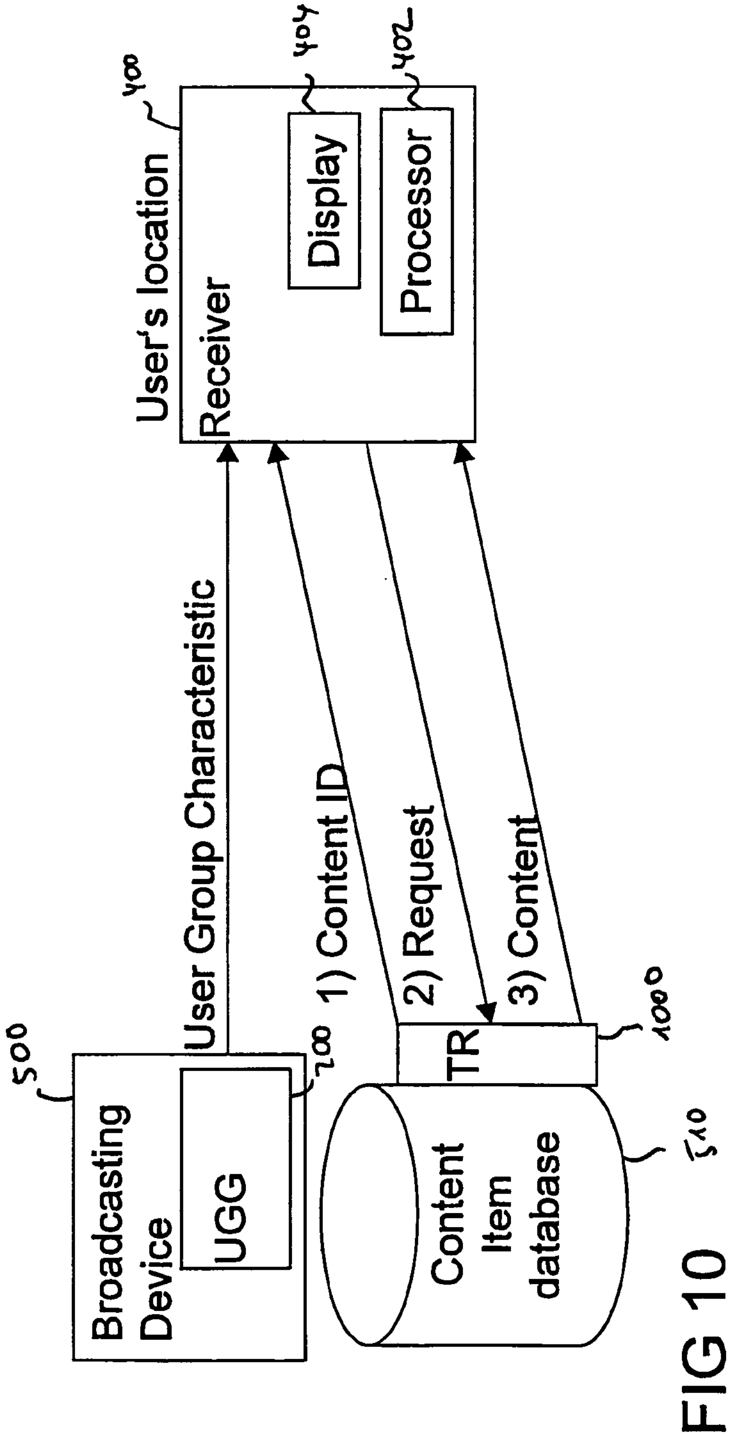
FIG. 10 shows schematically an embodiment for sending a content item after a request.

In FIG. 10 a further embodiment is depicted, in which the receiver 400 after having recommended a certain content item is requesting a content item from the content item database 510 via a transmitter-receiver 1000, which transmits the content item after having received the corresponding request.

Figure 11:
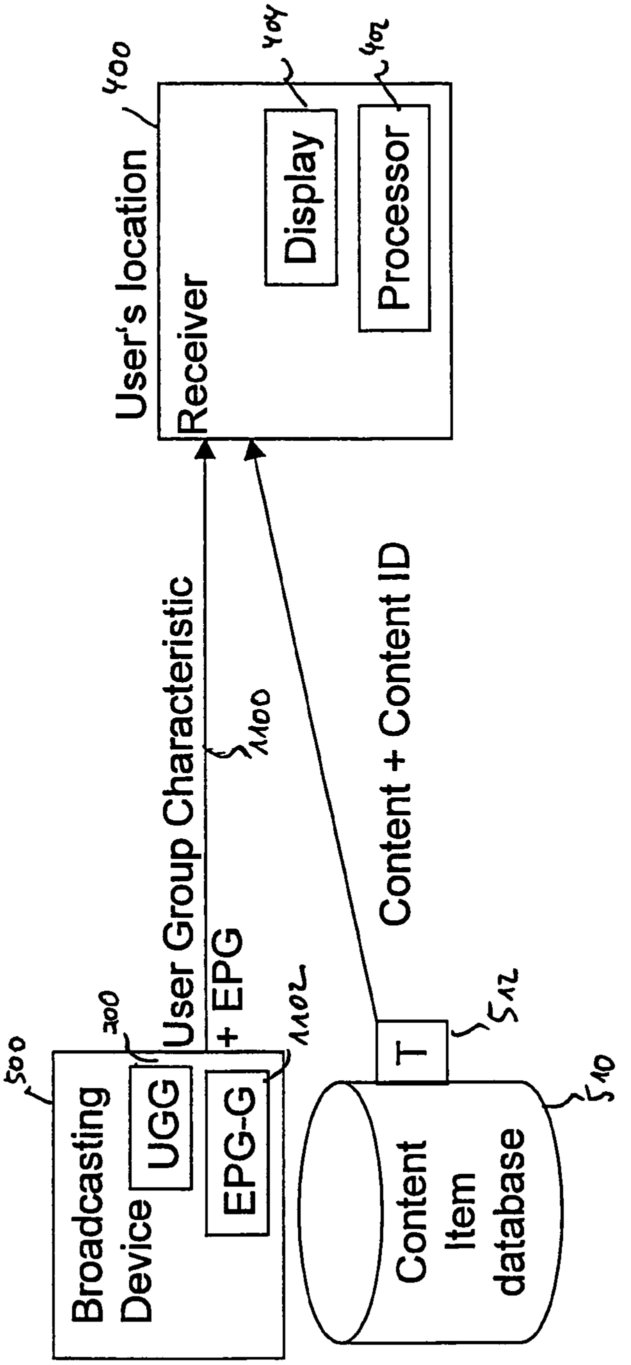
FIG. 11 is showing an embodiment wherein user group characteristics are transmitted together with an electronic program guide.

In FIG. 11 a further embodiment is depicted, in which a user group generator 200 uses a data channel 800 to transmit the user group characteristics, the data channel 800 already being used for the transmission of an electronic program guide (EPG), generated by an electronic program guide generator EPG-G 1102. This is especially useful, in case the data channel 800 provides further transmission capacity, which is for example the case for some satellite communication data channels.

For example the business "TVTV" can be used as an example. "TVTV" is a metadata (electronic program guide data, EPG data) provider based in Munich, which offers both a web based interface to its content items and also sends the content via satellite broadcast to TV sets which are capable to receive an interpreted.

By means of the web based service, a lot of the user data from probe users is available to TVTV, which allows to group user into user groups, and consequently, allows to do collaborative filtering based recommendations. Allocating a new user to an existing group of users, where ratings of TV programs are known, does this. After this grouping has been done, content items that have been evaluated positively by prior probe users can be recommended to the user in question.

The user group characteristics are broadcasted over the EPG data channel 800 (via satellite), adding some overhead to the existing metadata that is transported by this channel. The user group properties have essentially two parts: a user group characteristics part, which allows to assign the current user in one of the existing user groups (to the local grouping), and the user group preference data part, which coats the group preferences in some way, and allows the receiver at the user's location to give recommendations. It is possible to broadcast the user groups in a hierarchical order, where first the broadest user groups are transmitted, followed by more fine-grained sub-groupings of the major groups. This way, the receiver does not have to wait until all the metadata has been broadcasted, but can already start to give recommendations based on the course grouping that has been broadcasted first.

The basic idea can be applied to many different services, devices and data types. In the TV example, the user group preference data could comprise keywords plus weights for each of the keywords, which could then be used to access the EPG data by information retrieval methods (e.g. tf-idf (term frequency-inverse document frequency) based lookup), where the keywords plus their weights constitute user profiles for the respective user groups (and could be just the sum of the user profiles of the constituance of the subgroup). The user group characteristics part, on the other hand, could contain rating information for individual TV programs, or information how frequently typical members of the respective user group watch a given program. The TV receiver to find out about the user group membership of the current user can use such information locally.

A broadcast of collaborative filtering basic information is proposed, which has been clustered (grouped) to adequately compress it, over a public channel to a variety of end devices which, at least in part, do not have the feedback mechanisms. By this information it will be possible for the end devices to offer personalization services without being actively connected to the respective server of the content item database.

It is possible to create collaborative filtering based recommendation systems of various types which do not require bi-directional server connections. This means that is e.g. possible to offer fully personalized TV program recommendations for users or other TV set as a receiver which does not have any connection to the internet.

This also means that there are no privacy issues with the user, since none of his preferences is being transmitted to the service operators.

The invention claimed is:

1. A method for recommending content items, comprising:

receiving, at a user's receiver, a broadcast of user group characteristics that describe respective user groups with relationship information that correlates the user groups with content item identifiers;

receiving, at said receiver, content items with corresponding content item identifiers;

assigning, at said receiver, by user selection via a user interface of said receiver, the user to at least one of said user groups based on the received user group characteristics that describe respective user groups with relationship information that correlates the user groups with content item identifiers; and recommending, at said receiver, ones of said content items based on said relationship information, an assigned user group, and said content item identifiers that are received with said content items, wherein said receiver is in one-way communication with a content provider or a service operator and a usage behavior of the user is not transmitted to the content provider or the service operator.

2. The method according to claim 1, further comprising:

evaluating said usage behavior of the user; and comparing said usage behavior with said user group characteristics, wherein said assigning the user to at least one of said user groups is based on which user group characteristic corresponds to said usage behavior.

3. The method according to claim 1, wherein said user group characteristics are derived automatically by grouping probe users, who gave similar feedback to same content items.

4. The method according to claim 1, wherein said user group characteristics are derived by identifying correlated content items and finding probe users, who gave similar feedback to said correlated content items.

5. The method according to claim 3, further comprising:

adapting said user group characteristics according to further feedback, said further feedback being provided by said probe users.

6. The method according to claim 1, further comprising:

deriving user group descriptive meta data from said user group characteristics as said user group preference data;

deriving descriptive meta data for said content items;

comparing said user group descriptive meta data with said descriptive meta data; and recommending content items with descriptive meta data, which is similar to the user group descriptive meta data of said assigned user group.

7. The method according to claim 6 wherein said descriptive meta data is transmitted from a content item database to said receiver.

8. The method according to claim 6, wherein said descriptive meta data is derived at said receiver.

9. The method according to claim 1, wherein said user group characteristics comprises a hierarchical order with broad main user group characteristics and narrower sub-group characteristics, and wherein said main user group characteristics are received before said sub-group characteristics.

10. The method according to claim 1, wherein said user group characteristics are received over a data channel used for broadcasting an electronic program guide.

11. The method according to claim 1, wherein said relationship information includes a list of said user groups and associated content identifiers.

12. The method according to claim 1, wherein the broadcast is from the content provider or the service provider in one-way communication with said receiver.

13. A system for recommending content items, comprising:

a broadcasting device to broadcast user group characteristics descriptive of respective user groups and to broadcast relationship information that correlates the user groups with content item identifiers; and a receiver to receive said broadcasted user group characteristics and said broadcasted relationship information, said receiver including a processor configured to:

assign, by user selection via a user interface of said receiver, at least one of said user groups to said user based on the received user group characteristics descriptive of respective user groups and the received relationship information that correlates the user groups with content item identifiers, receive, from a content item database, content items with corresponding content item identifiers, and recommend ones of said content items based on said relationship information, an assigned user group, and said content item identifiers that are received with said content items, without communicating a usage behavior of said user to a content provider or a service operator, wherein said receiver is in one-way communication with the content provider or the service operator.

14. The system according to claim 13, wherein said receiver further comprises:

a display configured to display said user groups.

15. The system according to claim 13, wherein said processor is further configured to evaluate said usage behavior of said user, to compare said usage behavior with said transmitted user group characteristics, and wherein said assigning is based on which user group characteristic corresponds to said usage behavior.

16. The system according to claim 13, wherein said broadcasting device further comprises:

a user group generator configured to derive said user group characteristics automatically by grouping probe users, who gave similar feedback to same content items.

17. The system according to claim 13, wherein said broadcasting device further comprises:

a user group generator configured to derive said user group characteristics by identifying correlated content items and finding probe users, who gave similar feedbacks to said correlated content items.

18. The system according to claim 16, wherein said user group generator is further configured to generate adapted user group characteristics based on on-going feedback of said probe users, and wherein said broadcasting device is configured to broadcast said adapted user group characteristics.

19. The system according to claim 16, further comprising:

said content item data base, said content item data base being connected with said user group generator and being configured to determine said relationship information.

20. The system according to claim 13, further comprising:

a data channel used for broadcasting an electronic program guide and for broadcasting said user group characteristics.

21. A receiver for recommending content items, said receiver being configured to receive broadcasted user group characteristics, broadcasted relationship information that correlates the user groups with content item identifiers, and content items with corresponding content item identifiers, said user group characteristics describing respective user groups, and said receiver comprising a processor to assign, based on user selection via a user interface of said receiver, at least one of said user groups to said user based on the received user group characteristics and the received relationship information that correlates the user groups with content item identifiers, and to recommend ones of said content items based on said relationship information, an assigned user group, and said content item identifiers that are received with said content items, wherein said receiver is in one-way communication with a content provider or a service operator and a usage behavior of the user is not transmitted to the content provider or the service operator.

22. The receiver according to claim 21, further comprising:

a display configured to display said user groups.

23. The receiver according to claim 21, wherein said receiver is further configured to evaluate said usage behavior of the user, to compare said usage behavior with said transmitted user group characteristics, and wherein said assigning is based on which user group characteristic corresponds to said usage behavior.

24. The receiver according to claim 21, wherein said receiver is further configured to receive descriptive meta data for said content items and to receive user group descriptive meta data, and wherein said processor is further configured to compare said user group descriptive meta data with said descriptive meta data, and to recommend content items with descriptive meta data, which is similar to the user group descriptive meta data of said assigned user group.

* * * * *